US012224521B2

(12) United States Patent
Nicholson

(10) Patent No.: US 12,224,521 B2
(45) Date of Patent: Feb. 11, 2025

(54) SUBSEA ELECTRICAL CONNECTOR

(71) Applicant: ONESUBSEA IP UK LIMITED, London (GB)

(72) Inventor: Joseph Allan Nicholson, Barrow in Furness (GB)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 18/708,317

(22) PCT Filed: Jan. 26, 2023

(86) PCT No.: PCT/US2023/011623
§ 371 (c)(1),
(2) Date: May 8, 2024

(87) PCT Pub. No.: WO2023/146964
PCT Pub. Date: Aug. 3, 2023

(65) Prior Publication Data
US 2024/0421530 A1 Dec. 19, 2024

Related U.S. Application Data

(60) Provisional application No. 63/303,360, filed on Jan. 26, 2022.

(51) Int. Cl.
*H01R 13/523* (2006.01)
*E21B 17/02* (2006.01)
*H01R 13/627* (2006.01)

(52) U.S. Cl.
CPC ....... *H01R 13/523* (2013.01); *H01R 13/6271* (2013.01); *E21B 17/028* (2013.01)

(58) Field of Classification Search
CPC .. H01R 13/523; H01R 13/6271; E21B 17/028
See application file for complete search history.

(56) References Cited

U.S. PATENT DOCUMENTS 4,142,770 A 3/1979 Butler, Jr.
4,174,875 A * 11/1979 Wilson ................ H01R 13/523 439/700

(Continued)

FOREIGN PATENT DOCUMENTS

EP 0251655 A1 1/1988
EP 3376605 A1 9/2018
WO 2002082590 A1 10/2002

OTHER PUBLICATIONS

International Search Report and Written Opinion issued in International Patent Application No. PCT/US2023/011623 on May 25, 2023; 9 pages.

*Primary Examiner* — Briggitte R. Hammond
(74) *Attorney, Agent, or Firm* — Jeffrey D. Frantz

(57) ABSTRACT

A system includes a first electrical connector configured to removably couple with a second electrical connector. The first electrical connector includes a housing having an axial opening. The first connector also includes a movable support disposed inside the housing. The movable support includes a first connector portion having a first electrical path with a first radial contact electrically coupled to a first axial contact. The first electrical connector also includes a stationary support disposed inside the housing. The stationary support includes a first mating connector portion having a first mating electrical path with a first mating axial contact coupled to a first electrical cable. The first electrical connector also includes a shuttle pin configured to engage with the second electrical connector through the axial opening in the housing. The shuttle pin is configured to move along a first axial path of travel in a first connection stage. The movable support is configured to move along a second axial path of travel in a second connection stage. The first connection stage is configured to engage the first radial contact of the first electrical connector with a first mating (Continued)

radial contact of the second electrical connector at a first axial position in response to the first axial path of travel. The second connection stage is configured to engage the first axial contact with the first mating axial contact over a first axial distance in response to the second axial path of travel.

20 Claims, 11 Drawing Sheets

(56) References Cited

U.S. PATENT DOCUMENTS

| | | | | |
|---|---|---|---|---|
| 4,192,569 | A | 3/1980 | Mucci | |
| 5,358,418 | A | 10/1994 | Carmichael | |
| 5,645,438 | A | 7/1997 | Cairns | |
| 5,899,765 | A | 5/1999 | Niekrasz | |
| 6,332,787 | B1 | 12/2001 | Barlow | |
| 6,511,335 | B1 | 1/2003 | Rayssiguier | |
| 7,112,080 | B2 | 9/2006 | Nicholson | |
| 7,731,515 | B2 * | 6/2010 | Nicholson | H01R 13/523<br>439/201 |
| 2005/0042903 | A1 | 2/2005 | Nicholson | |
| 2016/0276775 | A1 | 9/2016 | Nicholson | |
| 2017/0141511 | A1 | 5/2017 | Tucker | |
| 2017/0141551 | A1 | 5/2017 | Puchalska | |
| 2019/0044256 | A1 | 2/2019 | Gelderd et al. | |

* cited by examiner

SUBSEA ELECTRICAL CONNECTOR

CROSS-REFERENCE TO RELATED APPLICATIONS

This application claims the benefit of U.S. Non-Provisional Application No. 63/303,360 entitled "Dual Contact Single Pin Concentric Wet Mateable Connector Improvements," filed Jan. 26, 2022, the disclosure of which is incorporated herein by reference in its entirety.

BACKGROUND

The present disclosure generally relates to systems and methods for delivering electrical power and communication to subsea production equipment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

The present invention relates to the field of electrical connectors for use with subsea wellhead equipment, but could equally be applied to subsea power and control applications. Equipment associated with subsea wellheads experience high pressures and temperatures during continuous operation. Electrical connectors of this type form pressure barriers across the wellhead components and are subject to these same severe operation parameters. As such, improved systems and methods for subsea electrical connectors are needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system includes a first electrical connector configured to removably couple with a second electrical connector. The first electrical connector includes a housing having an axial opening. The first connector also includes a movable support disposed inside the housing. The movable support includes a first connector portion having a first electrical path with a first radial contact electrically coupled to a first axial contact. The first electrical connector also includes a stationary support disposed inside the housing. The stationary support includes a first mating connector portion having a first mating electrical path with a first mating axial contact coupled to a first electrical cable. The first electrical connector also includes a shuttle pin configured to engage with the second electrical connector through the axial opening in the housing. The shuttle pin is configured to move along a first axial path of travel in a first connection stage. The movable support is configured to move along a second axial path of travel in a second connection stage. The first connection stage is configured to engage the first radial contact of the first electrical connector with a first mating radial contact of the second electrical connector at a first axial position in response to the first axial path of travel. The second connection stage is configured to engage the first axial contact with the first mating axial contact over a first axial distance in response to the second axial path of travel.

In certain embodiments, a system includes a first electrical connector configured to removably couple with a second electrical connector. The first electrical connector includes a housing having an axial opening. The first electrical connector also includes a movable support disposed inside the housing. The movable support includes a first connector portion having a first electrical path with a first radial contact electrically coupled to a first axial contact. The first electrical connector also includes a stationary support disposed inside the housing. The stationary support includes a first mating connector portion having a first mating electrical path with a first mating axial contact coupled to a first electrical cable. The second electrical connector is configured to extend through the axial opening in the housing. A first mating radial contact of the second electrical connector is configured to engage with the first radial contact. The first axial contact is configured to engage with the first mating axial contact. The first electrical connector also includes a first insulative layer disposed along an interior of the housing. The first electrical connector also includes a second insulative layer disposed about the first electrical path and the first mating electrical path.

In certain embodiments, a method includes providing a first connection stage between first and second electrical connectors. The first electrical connector includes a movable support, a stationary support, and a shuttle pin disposed in a housing having an axial opening. The movable support includes a first connector portion having a first electrical path with a first radial contact electrically coupled to a first axial contact. The stationary support includes a first mating connector portion having a first mating electrical path with a first mating axial contact coupled to a first electrical cable. The axial opening enables entry of the second electrical connector to engage the shuttle pin. The first connection stage includes movement of the shuttle pin along a first axial path of travel. The first connection stage engages the first radial contact of the first electrical connector with a first mating radial contact of the second electrical connector at a first axial position in response to the first axial path of travel. The method also includes providing a second connection stage between the first and second electrical connectors. The second connection stage includes movement of the movable support along a second axial path of travel. The second connection stage engages the first axial contact with the first mating axial contact over a first axial distance in response to the second axial path of travel. The method also includes providing insulation via a first insulative layer disposed along an interior of the housing and a second insulative layer disposed about the first electrical path and the first mating electrical path.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
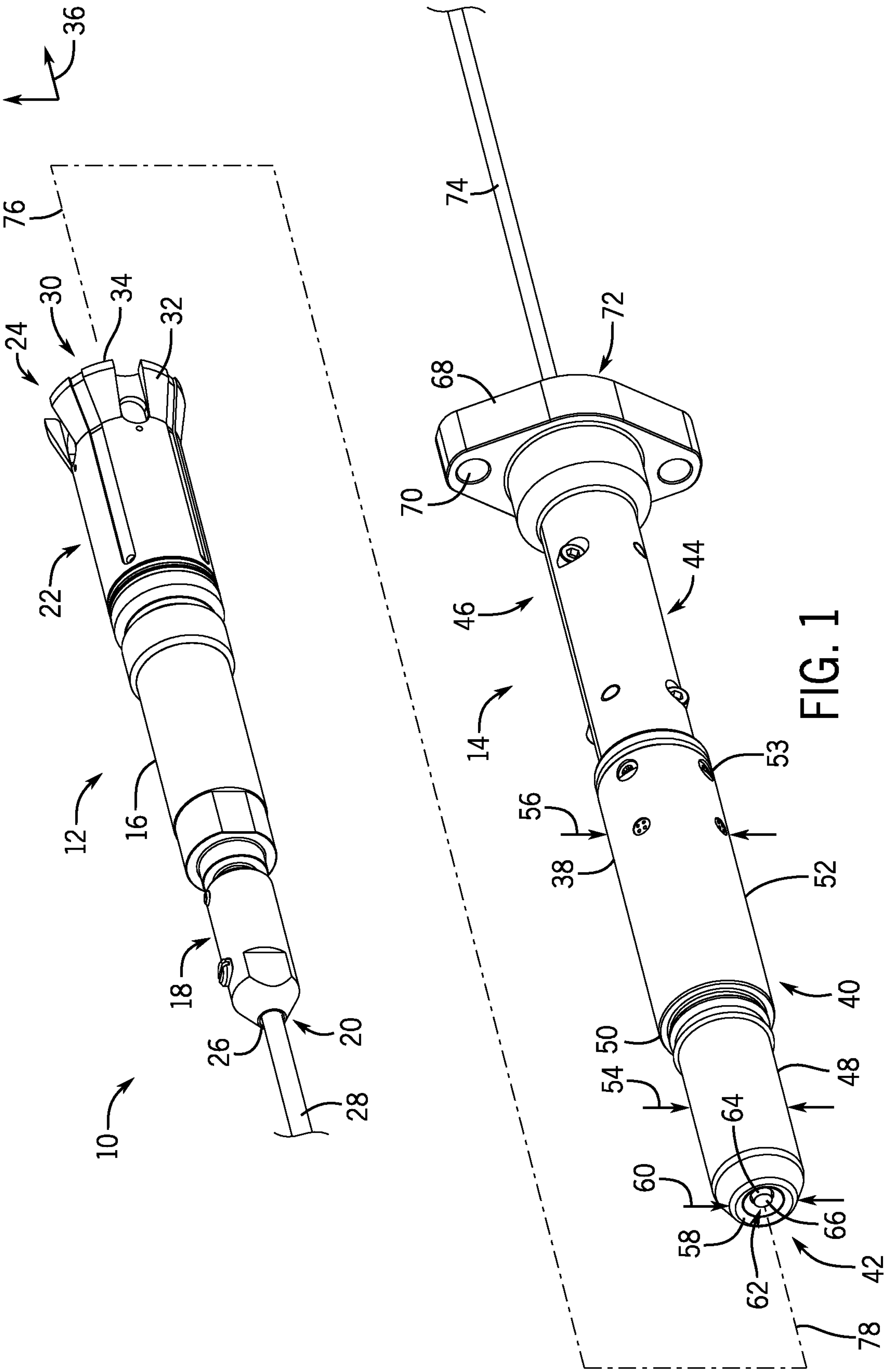
FIG. 1 is an exploded perspective view of a subsea electrical connection system, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Conventional subsea wellheads include a number of large operational steel assemblies that form a pressure enclosure yet allow the wellhead to be deployed in sections and work-over operations to be carried out in service. The wellhead sections form sub-assemblies that provide the interface points for the electrical and hydraulic feed through systems. Due to the operational requirements of these wellheads, there exists a need for the electrical and hydraulic connectors to accommodate large variations in the relative positions of the wellhead parts, which form these connector interfaces. As wellheads are deployed in more aggressive deeper locations, the need for more reservoir data increases, therefore there is a drive towards more space saving couplers and devices.

This application is related to U.S. Pat. No. 7,112,080, filed on Dec. 16, 2003, which is incorporated by reference herein, and is related to an International Application having Serial No. PCT/GB02/01205, filed on Mar. 14, 2002, which is incorporated by reference herein. The present disclosure relates to the enhancement features to the dual contact wet mateable connector described in U.S. Pat. No. 7,112,080, which provides significant improvements to the connector's operational performance.

As such, in certain embodiments of the present disclosure, a first connector (e.g., female connector or receptacle) may be mated with a second connector (e.g., male connector or plug) in two connection stages. In the first connection stage, a central pin of the first connecter engages a shuttle pin of the second connector along a bore of the second connector. The central pin may depress the shuttle pin via a shuttle spring until radial contacts disposed about the bore of the second connector align with mating radial contacts on the central pin of the first connector. The shuttle pin may also engage a two-stage release latch, which enables a disengagement of a movable support disposed within the second connector to initiate a second connection stage. In the second connection stage, the shuttle pin, via an abutment between the shuttle pin and movable support, may cause an axial path of travel of the movable support, and a concurrent engagement of axial contacts and mating axial contacts over an axial distance within the second connector.

In certain embodiments, the second connector may include a housing insulation that encapsulates the interior of the second connector. Furthermore, the second connector interior may include axial contacts and corresponding mating axial contacts. The axial contacts and corresponding mating axial contacts may additionally be individually enclosed in insulation. In this manner, the axial contacts and corresponding mating axial contacts are enclosed via two layers of insulation providing improved insulation resistance.

In certain embodiments, a mount is coupled to the second connector. The mount includes a rotatable arm coupling a mounting flange with a base portion of the second connector. The rotatable arm includes an outer sleeve disposed about an inner conduit. The inner conduit is configured to flex during rotation of the rotatable arm. The mount includes a first ball and socket joint between the rotatable arm and the base portion of the mating connector, a second ball and socket joint between the rotatable arm and the mounting flange, or a combination thereof.

FIG. 1 is an exploded view of a subsea electrical connection system 10 having a connector 12 configured to removably couple with a connector 14. The connector 12 may be described as a first connector, a female connector, a female contact connector, or a connector receptacle, whereas the connector 14 may be described as a second connector, a male connector, a male contact connector, or a connector plug. Each of the connectors 12 and 14 include both mechanical and electrical connections, wherein the mechanical connections structurally secure the connectors 12 and 14 together and the electrical connectors complete one or more electrical paths between the connectors 12 and 14. As discussed in detail below, the subsea electrical connection system 10 includes a multi-stage connection system (e.g., two-stage connection system) configured to couple together the connectors 12 and 14 in a plurality of connection stages (e.g., at least first and second connection stages). Additionally, one or both of the connectors 12 and 14 may include multiple layers of insulation, pressure balancing barriers, fluid seals, and flexible mounts. The connectors 12 and 14 are configured to insulate, seal, and protect internal electrical paths before, during, and after connections between the connectors 12 and 14.

The connector 12 includes an outer housing 16 (e.g., annular housing), which encloses a cable termination portion 18 on a first axial side 20 of the connector 12 and a first connector portion 22 on a second axial side 24 of the connector 12. The outer housing 16 may be a metallic outer housing having internal insulation. The first axial side 20 includes a port 26 configured to receive a first cable 28. The first cable 28 may include any number of electrical conductors, such as 1, 2, 3, 4, 5, or more, and may be disposed in a metallic jacket for protection and sealing purposes. In the illustrated embodiment, the first cable 28 includes at least two electrical conductors. The second axial side 24 of the connector 12 includes a first axial opening 30 (e.g., annular opening) and a frustoconical guide 32 (e.g., tapered annular guide) enclosing the first axial opening 30, such that a side 34 of the tapered guide 28 having a larger dimension (e.g., diameter) faces outwardly in longitudinal direction 36.

The connector 14 includes an outer housing 38 (e.g., annular housing), which includes a second connector portion 40 on a first axial side 42 of the connector 14 and a mounting portion 44 on a second axial side 46 of the connector 14. The outer housing 38 may be a metallic outer housing having internal insulation. The second connector portion 40 includes a mating portion 48 coupled to a base portion 52 of the connector portion 40 via a mating edge 50 (e.g., annular shoulder or abutment). The outer housing 38 includes one or more pressure ports 53 (e.g., along the base portion 52) for enabling pressure balancing between an exterior (e.g., exterior fluid such as seawater) and an interior (e.g., interior fluid such as oil or lubricant) of the connector 14 via a pressure balancing barrier 126 (see FIG. 2). In the illustrated embodiment, a dimension 54 (e.g., diameter) of the mating portion 48 is smaller than a dimension 56 (e.g., diameter) of the base portion 52. For example, the dimension 54 may be 1, 2, 3, 4, 5, 6, 7, 8, 9, or 10 percent less than the dimension 56. A first axial end 58 (e.g., opposite of longitudinal direction 36) of the mating portion 48 is tapered (e.g., frustoconical), such that a dimension 60 of the axial end 58 is smaller than the dimension 54 of the mating portion 48. The axial end 58 includes a second axial opening 62 (e.g., annular opening) having a tapered (e.g., frustoconical) profile, such that a side of the second axial opening 62 having a larger dimension faces outwardly, opposite of longitudinal direction 36. A shuttle pin 64 (e.g., shuttle, actuation pin, latch release actuator, etc.) protrudes through the side of the second axial opening 62 having the smaller dimension (e.g., side facing longitudinal direction 36) and includes an indentation 66 (e.g., conical indentation). The mounting portion 44 includes a mounting flange 68 having one or more flange holes 70 (e.g., bolt receptacles) configured to enable a mounting of the connector 14 on a subsea structure (e.g., tree). A second axial end 72 of the connector 14 (e.g., at a surface of the mounting flange 68), includes an opening to receive a second cable 74.

In the illustrated embodiment, the connector 12 is configured to engage (e.g., removably couple with) the connector 14, thereby aligning a first central axis 76 of the connector 12 with a second central axis 78 of the connector 14. The mating edge 50 is configured to abut the frustoconical guide 32 of the connector 12 in response to the connector 12 fully engaging the connector 14. In certain embodiments, the mating edge 50 may also be configured to transfer a load (e.g., force) exerted by the connector 14 onto the connector 12. The connector 12 may engage the connector 14 by an axial movement of the connector 14 relative to the connector 12, an axial movement of the connector 12 relative to the connector 14 or, in certain embodiments, concurrent axial movements of both the connector 12 and the connector 14. In the illustrated embodiment, the connectors 12 and 14 are shown as having an annular (e.g., circular) shape, however, in certain embodiments, the connectors 12 and 14 may have a non-annular shape. Furthermore, the illustrated embodiment shows the connector 12 as a female connector (e.g., female contact connector) and the connector 14 as a male connector (e.g., male contact connector). That is, engagement of the connector 12 with the connector 14 is achieved via an insertion of the mating portion 48 of the connector 14 into the first axial opening 30 of the connector 12. In certain embodiments, the connector 12 may be a male connector and the connector 14 may be a female connector. That is, in certain embodiments, engagement of the connector 12 with the connector 14 may be achieved via an insertion of a portion of the connector 12 into the connector 14.

Figure 2:
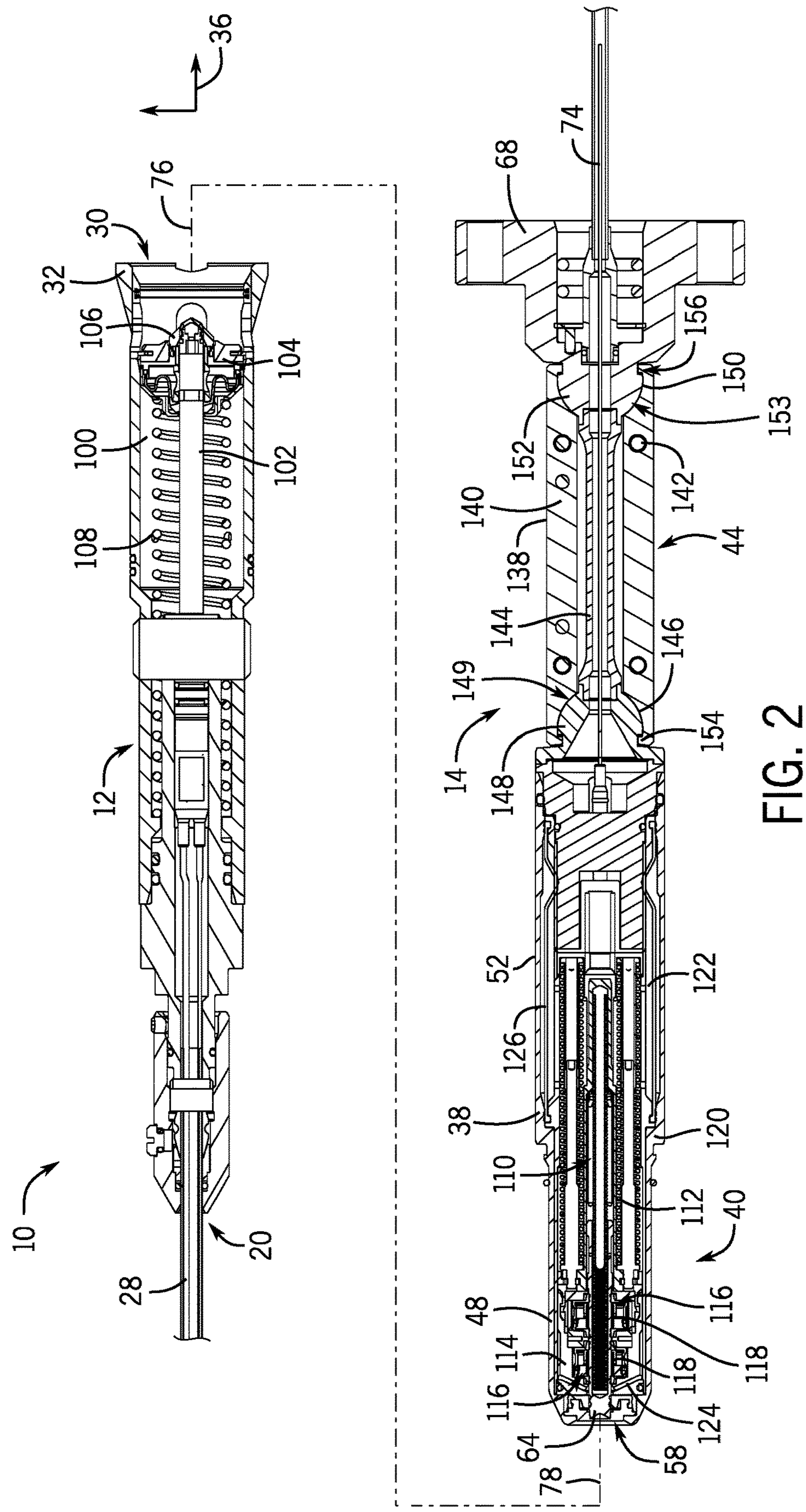
FIG. 2 is an exploded cross-sectional view of the subsea electrical connection system of FIG. 1, according to an embodiment of the present disclosure.

FIG. 2 is an exploded cross-sectional view of the subsea electrical connection system 10 of FIG. 1. In the illustrated embodiment, the connector 12 includes the first axial opening 30 extending into an axial chamber 100 (e.g., annular chamber). The connector 12 also includes a central pin 102 (e.g., male pin or annular connector shaft) disposed inside the axial chamber 100, and extending along the first central axis 76 of the connector 12. The central pin 102 is electrically coupled to the first cable 28 and is mechanically coupled to the remaining structure of connector 12, such that the central pin 102 is at least partially retained by the connector 12 in the longitudinal direction 36. The connector 12 also includes a wiper assembly 104 (e.g., annular wiper assembly) disposed inside the axial chamber 100 and disposed about the central pin 102. The wiper assembly 104 includes a wiper 106 (e.g., annular wiper), configured to make sealing contact with and slide axially along the central pin 102. The wiper assembly 104 may contain a fluid (e.g., oil, insulating grease) to insulate and/or pressure balance the wiper 106, allowing free movement at depth pressure. The connector 12 also includes a wiper spring 108 coupled to the wiper assembly 104 and configured to exert a biasing force on the wiper assembly 104. The wiper spring 108 is disposed about the central pin 102 and extends to the first axial side 20 of the connector 12. The wiper assembly 104 is configured to make contact with the first axial end 58 of the connector 14 in response to an insertion of the mating portion 48 into the first axial opening 30 of the connector 12. As the mating portion 48 is further inserted into the axial chamber 100, the connector 14 exerts a load onto the wiper assembly 104, thereby causing the wiper assembly 104 to travel axially through the axial chamber 100 (e.g., opposite of direction 36) while axially compressing the wiper spring 108. As the wiper assembly 104 moves axially along the central pin 102, the wiper 106 presses against the central pin 102, thereby wiping the central pin 102 to block contaminants from entering the connector 14 when coupling together the connectors 12 and 14. The wiper 106 also may seal against or around the central pin 102, thereby blocking the ingress of contaminants (e.g., seawater, debris, etc.) into the connector 12. In response to the mating portion 48 being removed from the axial chamber 100, the wiper spring 108 may provide a biasing force on the wiper assembly 104, causing the wiper assembly 104 to return to its initial position.

The illustrated embodiment also shows the first axial opening 30 and frustoconical guide 32. As shown in the illustrated embodiment, the first axial opening 30 is frustoconical in shape and enclosed (e.g., circumferentially surrounded) by the frustoconical guide 32. The slightly larger diameter of the first axial opening 30 may assist in aligning the first central axis 76 of the connector 12 with the second central axis 78 of the connector 14, thereby guiding the mating portion 48 of the connector 14 into the first axial opening 30.

In the illustrated embodiment, the connector 14 includes a connector assembly 110 disposed in the mating portion 48 and base portion 52, and inside the outer housing 38. The connector assembly 110 includes a shuttle pin spring 112 (e.g., shuttle spring) coupled to the shuttle pin 64, and a movable support 114 disposed around the shuttle pin spring 112. The movable support 114 includes one or more connector portions 116 (e.g., 1, 2, 3, 4, 5, or more electrical connector portions), which each include one or more radial contacts 118 (e.g., 1, 2, 3, 4, 5, or more radial electrical contacts). The radial contacts 118 may include annular contacts, circumferentially spaced radial contacts, axially spaced radial contacts, or a combination thereof. The radial contacts 118 include electrical contacts (e.g., electrically conductive and/or metallic contacts). The connector 14 includes a housing insulation layer 120 (e.g., electrical insulation layer) disposed along and/or lining an interior surface of the housing 38, wherein the housing insulation layer 120 extends around (e.g., enclosing) the connector assembly 110. In certain embodiments, the housing insulation layer 120 may provide an encapsulating electrical insulation inside the outer housing 38, thereby electrically insulating electrical paths through the interior of the connector 14 (e.g., movable support 114 and connector portions 116). In some embodiments, the housing insulation layer 120 may be composed of a polymer material (e.g., organic thermoplastic polymer, polyaryletherketone polymers, polyether ether ketone (PEEK)), although other insulative materials may be used in certain embodiments.

Furthermore, the connector 14 includes a housing fluid chamber 122 (e.g., annular fluid chamber) disposed inside the housing 38 along the housing insulation layer 120 (e.g., outside connector portions 116) and, in certain embodiments, fluidly coupled to fluid paths 124 (e.g., internal fluid paths). The housing fluid chamber 122 and the fluid paths 124 may be configured to contain an internal fluid, such as a gas and/or liquid (e.g., lubricant, oil, electrically non-conductive fluid, etc.). A pressure balancing barrier 126 (e.g., pressure diaphragm) is disposed between the housing fluid chamber 122 (e.g., annular fluid chamber) and the outer housing 38 or, in certain embodiments, a secondary fluid chamber disposed between the pressure balancing barrier 126 and the outer housing 38. The pressure balancing barrier 126 is configured to expand and/or contract in response to changes in pressure of an internal fluid within the housing fluid chamber 122 and/or fluid paths 124 and an external fluid (e.g., seawater) entering through pressure ports 53, thereby pressure balancing between the internal and external fluids. Additionally, in certain embodiments, the housing fluid chamber 122 may be pressure compensated to allow axial movement of the movable support 114 and components coupled to the movable support 114 (e.g., connector portions 116).

In the illustrated embodiment, the mounting portion 44 of the connector 14 includes a rotatable arm 138 having an outer sleeve (e.g., split spine sleeve 140). The split spine sleeve 140 may include two spline halves (e.g., C-shaped sleeve portions split along longitudinal direction 36), which may be joined together via threaded fasteners 142 (e.g., threaded bolts, nuts, screws, etc.). The split spine sleeve 140 is disposed about an inner conduit 144 (e.g., conduit stem) configured to route or pass the second cable 74 to the connector portion 40 of the connector 14. In certain embodiments, the second cable 74 may be divided into two separate cables and routed through two separate inner conduits. The second cable 74 may include any number of electrical conductors, such as 1, 2, 3, 4, 5, or more. In the illustrated embodiment, the second cable 74 includes at least two electrical conductors.

In certain embodiments, a first socket profile 146 on a first axial end of the split spine sleeve 140 may be configured to engage a first ball mount 148 coupled to the base portion 52, thereby forming a first ball and socket joint 149. Additionally or alternatively, a second socket profile 150 on a second axial end of the split spine sleeve 140 may be configured to engage a second ball mount 152 coupled to the mounting flange 68, thereby forming a second ball and socket joint 153. Although the first and second ball mounts 148, 152 and corresponding first and second socket profiles 146, 150 may be spherical, other curved geometries may be used to enable rotational movement of the rotatable arm 138 relative to the base portion 52 and the mounting flange 68. The rotatable arm 138 (e.g., split spine sleeve 140) is configured to rotate via the first and/or second ball and socket joints 149, 153.

In certain embodiments, the split spline sleeve 140 includes overhangs 154 that extend into gaps 156 disposed between the ball mounts 148 and 152, and the base portion 52 and mounting flange 68, respectively. In certain embodiments, the overhangs 154 are configured to enable a partial rotation (e.g., relief rotation, relief angle) of the split spine sleeve 140 (e.g., mating portion 48). For example, the split spine sleeve 140 may be configured to rotate up to a threshold angle in each direction, such as up to a maximum of 1, 2, 3, 4, 5, 6, 7, 8, 9, or 10 degrees relative to the second central axis 78 of the connector 14. In certain embodiments, the inner conduit 144 is configured to flex (e.g., bend) during rotation of the split spine sleeve 140. It may be appreciated that the mounting portion 44 (e.g., first and second ball and socket joints 149, 153) along with the flexible inner conduit 144 may provide improved axial alignment of the connector 12 and connector 14 during mating.

In the illustrated embodiment, connector 12 is shown as having a female-type outer housing 16, with a male central pin 102. That is, the connector 12 may be described as having a male electrical portion (e.g., central pin 102) concentrically disposed inside a female outer housing 16. Additionally, connector 14 is illustrated as having a male outer housing 38, with a female axial opening 62 (e.g., central bore). That is, connector 14 may be described as having a female electrical portion concentrically disposed inside a male outer housing 38. In some embodiments, the genders associated with the outer housings and electrical portions for the connectors 12 and 14 may be reversed.

Figure 3:
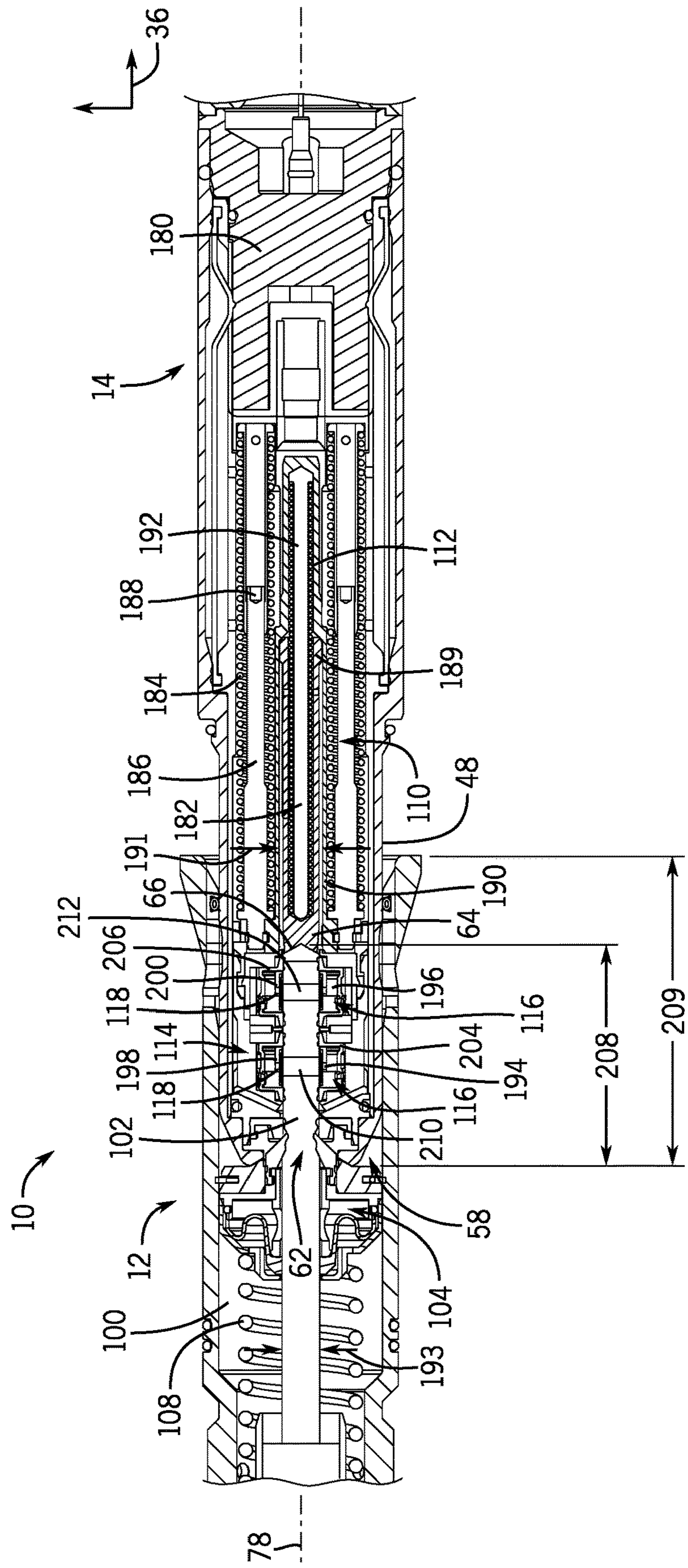
FIG. 3 is a cross-sectional view of the subsea electrical connection system of FIG. 1 at a first connection stage, according to an embodiment of the present disclosure.

FIG. 3 is a first cross-sectional view of the subsea electrical connection system 10 of FIG. 1 at a first connection stage between the connectors 12 and 14. In the illustrated embodiment, the connector assembly 110 further includes a stationary support 180 having a central bore 182 (e.g., annular bore) along the second central axis 78. The connector assembly 110 also includes one or more springs 184 (e.g., two springs, three springs, etc.) coupling the movable support 114 to the stationary support 180. In this manner, the springs 184 may be configured to exert a biasing force on the movable support 114, such that the movable support 114 is compressed against the first axial end 58 of the connector 14. In certain embodiments, the springs 184 may be supported by posts 186 (e.g., telescopic posts) disposed through each of the springs 184. In certain embodiments, the posts 186 may be coupled to the stationary support 180 via bolts 188.

In the illustrated embodiment, the shuttle pin 64 is disposed in an inner bore 190 (e.g., annular inner bore) of the movable support 114, and configured to engage the central pin 102 of the connector 12 through the second axial opening 62 of the connector 14. The shuttle pin 64 includes one or more shuttle protrusions 189 (e.g., radially protruding shuttle bumps) disposed on an end portion of the shuttle pin 64. In certain embodiments, the one or more shuttle protrusions 189 may include an annular radial protrusion or a plurality of circumferentially spaced radial protrusions. A dimension 191 (e.g., diameter) of the inner bore 190 is defined by a dimension 193 (e.g., diameter) of the central pin 102. For example, the inner bore dimension 191 may be slightly larger than the shuttle pin dimension 193 (e.g., a radial clearance of at least 1 or 2 mm), such that the central pin 102 is configured to travel through the inner bore 190. The shuttle pin spring 112 is disposed in the inner bore 190, such that one end of the shuttle pin spring 112 couples to the shuttle pin 64, and the other end of the shuttle pin spring 112 couples to the movable support 114. In this manner, the shuttle pin spring 112 may be configured to exert a biasing force on the shuttle pin 64, such that the shuttle pin 64 is compressed against the first axial end 58 of the connector 14. In certain embodiments, the biasing force generated by the shuttle pin spring 112 is smaller than the biasing force generated by the springs 184. For example, the biasing force generated by the shuttle pin spring 112 may range from 5-12 lbf, while the biasing force generated by the springs 184 may range from 15-30 lbf. In certain embodiments, the shuttle pin spring 112 may be supported by a post 192 (e.g., central telescopic post).

In the illustrated embodiment, the movable support 114 includes a plurality of connector portions 116, such as a first connector portion 194 and a second connector portion 196, each having respective radial contacts 118. For example, the first connector portion 194 includes a first radial contact 198 disposed about the inner bore 190, and the second connector portion 196 includes a second radial contact 200 also disposed about the inner bore 190, spaced by an axial spacing 202. In the illustrated embodiment, the radial contacts 118 (e.g., 198 and 200) include annular electrical contacts (e.g., electrically conductive and/or metallic contacts). In certain embodiments, the first and second connector portions 194 and 196 (e.g., first and second radial contacts 198 and 200) are positioned at the same axial position and different circumferential positions. For example, the first radial contact 198 may be disposed on one radial half (e.g., radial side) of the inner bore 190, and the second radial contact 200 may be disposed on a second radial half of the inner bore 190. The first connector portion 194 includes a first pressure balancing barrier 204 (e.g., first pressure diaphragm) disposed about the first radial contact 198. Additionally, the second connector portion 196 includes a second pressure balancing barrier 206 (e.g., second pressure diaphragm) disposed about the second radial contact 200. The first connector portion 194 and second connector portion 196 will be described in more detail in regards to FIG. 7.

As shown in the illustrated embodiment, the connector 14 is inserted a first axial distance 208 into the axial chamber 100 of the connector 12 during a first connection stage. The first axial end 58 of the mating portion 48 is configured to abut the wiper assembly 104, thereby axially moving or depressing the wiper assembly 104 via the wiper spring 108 opposite the longitudinal direction 36 into the axial chamber 100. The central pin 102 is configured to remain substantially stationary relative to the connector 12 as the mating portion 48 of the connector 14 is inserted into the axial chamber 100 of the connector 12, thereby causing an insertion of the central pin 102 into the second axial opening 62 of the connector 14 and into the inner bore 190. The central pin 102 is configured to abut the shuttle pin 64 via the indentation 66 and axially move or depress the shuttle pin 64 via the shuttle pin spring 112 (e.g., compressing the shuttle spring) in response to the central pin 102 traveling a second axial distance 209 along the inner bore 190, via a concentric arrangement of the central pin 102 and the inner bore 190.

A first mating radial contact 210 and a second mating radial contact 212 are disposed on the central pin 102 and separated by the axial spacing 202, such that the first and second mating radial contacts 210 and 212 are configured to axially align and radially contact (e.g., electrically and mechanically contact) with the first and second radial contacts 198 and 200, respectively, in response to the central pin 102 traveling the second axial distance 209. As discussed above, the radial contacts 198, 200, 210, and 212 may include annular contacts (e.g., annular electrical contacts) configured to contact one another after the central pin 102 pushes the shuttle pin 64 over the second axial distance 209, thereby completing the first connection stage. However, in certain embodiments, the first and second mating radial contacts 210 and 212 are positioned at the same axial position and different circumferential positions along the central pin 102, while the first and second radial contacts 198 and 200 are similarly positioned at the same axial position and different circumferential positions along the shuttle pin 64. For example, the first mating radial contact 210 may be disposed on one radial half (e.g., radial side) of the central pin 102, and the second mating radial contact 212 may be disposed on a second radial half of the central pin

102. Regardless of the particular configuration of the radial contacts 198, 200, 210, and 212, the first connection stage is configured to axially align and radially contact (e.g., electrically and mechanically contact) the first and second radial contacts 198 and 200 of the mating electrical connector 14 with the first and second mating radial contacts 210 and 212 of the connector 12, respectively, in response to a travel (e.g., axial path of travel) of the shuttle pin 64 pushed by the central pin 102 through the inner bore 190.

Figure 4:
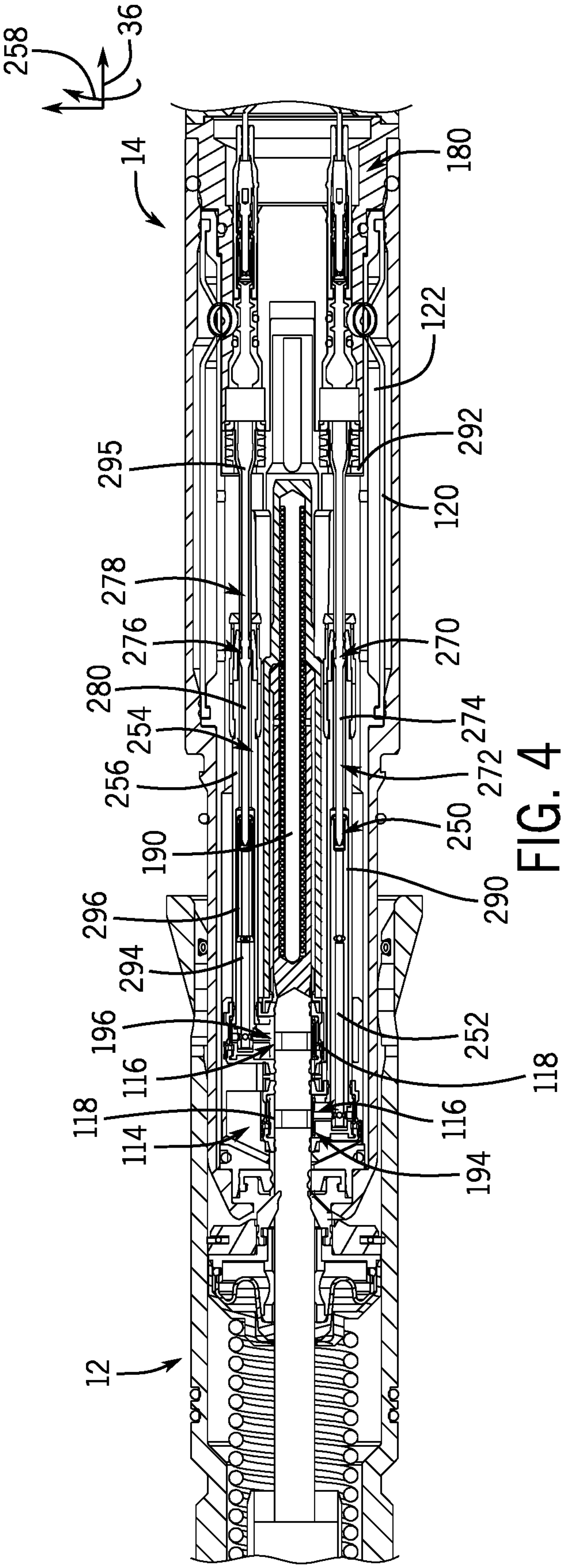
FIG. 4 is a cross-sectional view of the subsea electrical connection system of FIG. 1 at the first connection stage, according to an embodiment of the present disclosure.

FIG. 4 is a second cross-sectional view of the subsea electrical connection system 10 of FIG. 1 at the first connection stage. The second cross-sectional view of FIG. 4 is rotated by an angle (e.g., 90 degrees) relative to the first cross-sectional view of FIG. 3, thereby illustrating details of the connector portions 116. In the illustrated embodiment, the movable support 114 includes the connector portions 116 (e.g., first and second connector portions 194 and 196). The first connector portion 194 includes a first electrical path 250 from the first radial contact 198 electrically coupled to a first axial contact 252 extending in the longitudinal direction 36. Additionally, the second connector portion 196 includes a second electrical path 254 from the second radial contact 200 electrically coupled to a second axial contact 256 extending in the longitudinal direction 36. The first and second axial contacts 252 and 256 are metallic and/or electrically conductive axial contacts. In certain embodiments, the first and second axial contacts 252 and 256 are disposed radially outward from the inner bore 190 and offset 90 degrees in a circumferential direction 258 relative to the springs 184 (shown in FIG. 3). While the illustrated embodiment shows first and second connector portions 194 and 196, one or more connector portions 116 (e.g., and corresponding radial contacts 118) may be used in certain embodiments of the connector 14.

As shown in the illustrated embodiment, the stationary support 180 includes a first mating connector portion 270 having a first mating electrical path 272 with a first mating axial contact 274 electrically coupled to the second cable 74. Additionally, the stationary support 180 includes a second mating connector portion 276 having a second mating electrical path 278 with a second mating axial contact 280 electrically coupled to the second cable 74. The first and second mating axial contacts 274 and 280 are metallic and/or electrically conductive axial contacts. The first mating axial contact 274 extends in the direction opposite longitudinal direction 36 and is electrically coupled to the first axial contact 252, thereby joining the first electrical path 250 with the first mating electrical path 272. Additionally, the second mating axial contact 280 extends in the direction opposite longitudinal direction 36 and is electrically coupled to the second axial contact 256, thereby joining the second electrical path 254 with the second mating electrical path 278. The stationary support 180 also includes first and second anti-tracking devices 282 and 284 (e.g., electrical tracking) coupled to the first and second mating connector portions 270 and 276 (e.g., first and second mating axial contacts 274 and 280), respectively, which may extend a creepage distance associated with the first and second mating connector portions 270 and 276, and in certain embodiments, may seal with the housing insulation layer 120. In some embodiments, the anti-tracking devices may be composed of Viton or Perfluoroelastomer, though other materials may be used.

In the illustrated embodiment, the movable support 114 includes a first insulation layer 290 disposed about the first electrical path 250 and the first mating electrical path 272. The movable support 114 also includes a first seal 292 (e.g., wiper) disposed at an axial end of the first insulation layer 290 and disposed about the first mating electrical path 272. Additionally, the movable support 114 includes a second insulation layer 294 disposed about the second electrical path 254 and the second mating electrical path 278. The movable support 114 also includes a second seal 295 (e.g., wiper) disposed at an axial end of the second insulation layer 294 and disposed about the second mating electrical path 278. In certain embodiments, the housing fluid chamber 122 is disposed between the first and second insulation layers 290, 294 and the housing insulation layer 120. In certain embodiments, the first and second insulation layers 290 and 294 may include any suitable electrically non-conductive insulation material, such as PEEK insulation. The first and second insulation layers 290 and 294 are independent or separate from the housing insulation layer 120.

The first and second axial contacts 252 and 256 are configured to slide alone and/or telescopically engage with the respective first and second mating axial contacts 274 and 280, such as by using tubular contacts (e.g., female contacts) engaged with pin contacts (e.g., male contacts). In the illustrated embodiment, the first and second axial contacts 252 and 256 are tubular contacts (e.g., female contacts), and the first and second mating axial contacts 274 and 280 are pin contacts (e.g., male contacts). As shown in the illustrated embodiment, the first and second mating axial contacts 274 and 280 may be axially inserted in axial openings (e.g., central openings, central channels) of the first and second axial contacts 252 and 256, respectively, thereby axially overlapping the axial contacts 274 and 280 with the axial contacts 252 and 256. Additionally, as shown in the illustrated embodiment, the first and second axial contacts 252 and 256 both include axial channels 296 (e.g., axial fluid channels or pressure relief channels) disposed around the periphery of the contacts, which will be described in more detail in regards to FIG. 7. In certain embodiments, the first and second axial contacts 252 and 256 may be pin contacts (e.g., male contacts), and the first and second mating axial contacts 274 and 280 may be tubular contacts (e.g., female contacts). While the illustrated embodiment shows first and second axial contacts 252, 256 and first and second mating axial contacts 274 and 280, one or more axial contacts (e.g., and corresponding mating axial contacts) may be used in certain embodiments. Additionally, while the illustrated embodiment shows the first axial contact 252 being longer than the second axial contact 256, in some embodiments the second axial contact 256 may be longer, and in other embodiments the first and second axial contacts 252 and 256 may have the same length.

Figure 5:
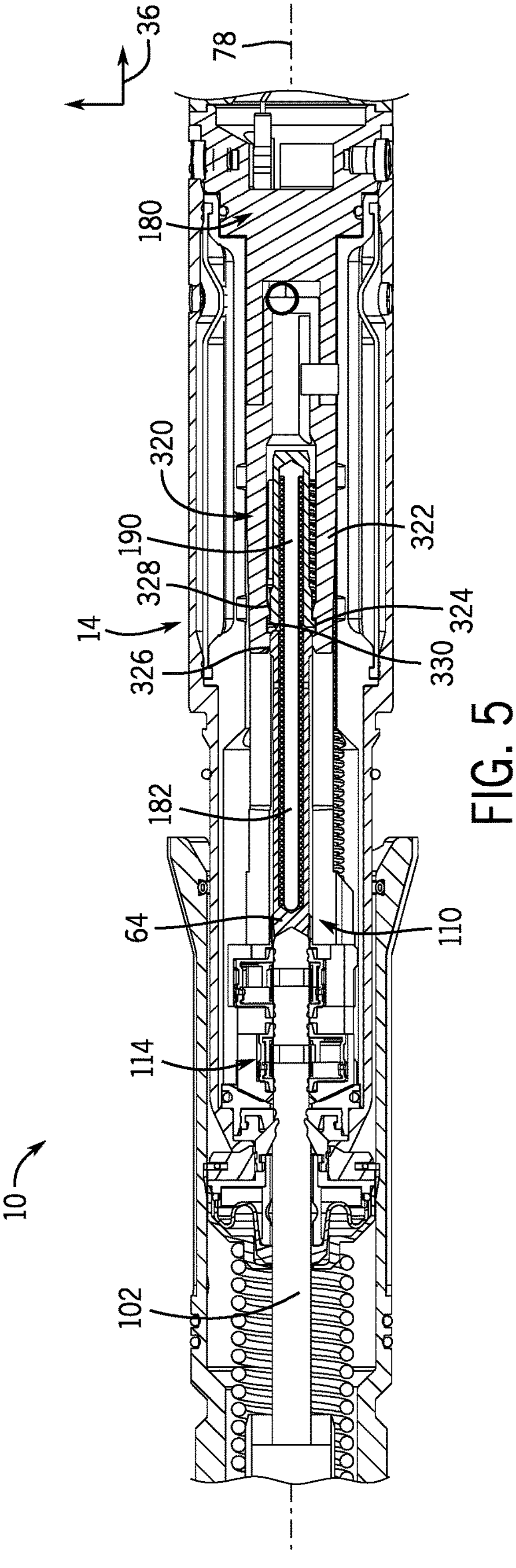
FIG. 5 is a cross-sectional view of the subsea electrical connection system of FIG. 1 at the first connection stage, according to an embodiment of the present disclosure.

FIG. 5 is a third cross-sectional view of the subsea electrical connection system 10 of FIG. 1 at the first connection stage. The third cross-sectional view of FIG. 5 is rotated by an angle relative to the first cross-sectional view of FIG. 3 and the second cross-sectional view of FIG. 4, thereby illustrating latching details of the connector assembly 110. As shown in the illustrated embodiment, the connector assembly 110 of the connector 14 includes a two-stage release latch 320 (e.g., two-stage release collet) coupled to the stationary support 180 and disposed along the second central axis 78 of the connector 14. The two-stage release latch 320 includes latch arms 322, which extend opposite longitudinal direction 36 alongside the circumference of the inner bore 190. Each of the latch arms 322 includes a latch groove 324, each latch groove 324 being disposed near an axial end of each latch arm 322 and facing radially inward toward the inner bore 190. Additionally, each latch arm 322 includes a first latch protrusion 326 and a second latch protrusion 328 on each axial side of the latch groove 324. The first latch protrusion 326 is tapered, such that the first latch protrusion 326 tapers inwardly (e.g., toward the second central axis 78) along a travel in the longitudinal direction 36.

Additionally, as shown in the illustrated embodiment, the movable support 114 includes an overhang 330 (e.g., annular overhang, annular lip) configured to extend radially outward toward the interior wall of the inner bore 190. The overhang 330 is configured to engage (e.g., mate with) the latch grooves 324 of the latch arms 322. The latch arms 322 are configured to radially contract (e.g., inward), such that the first and second latch protrusions 326 and 328 protrude a small distance (e.g., less than or equal to 1, 2, 3, 4, or 5 mm) into the inner bore 190. For example, the first and second latch protrusions 326 and 328 may extend into the inner bore 190, thereby at least partially retaining the movable support 114 at an axial position of the inner bore 190.

As shown in the illustrated embodiment, the shuttle pin 64 includes the shuttle protrusions 189 disposed on an axial end of the shuttle pin 64 (e.g., end of the shuttle closest to the stationary support 180) and facing radially outward toward the interior wall of the inner bore 190. In response to the axial movement of the shuttle pin 64 pushed by the central pin 102 in the first connection stage, the first and second mating radial contacts 210 and 212 of the central pin 102 align with the first and second radial contacts 198 and 200, respectively, while also releasing the two-stage release latch 320. In particular, the shuttle pin 64 (e.g., via the shuttle protrusions 189) is configured to abut the tapered portion of the first latch protrusions 326, thereby causing the latch arms 322 to expand radially outward. The outward expansion of the latch arms 322 causes the second latch protrusions 328 to radially extend past the interior wall of the inner bore 190, thereby removing axial retention of the movable support 114 by the latch arms 322, and enabling the movable support 114 to axially travel through the central bore 182 (e.g., or continue axial travel through inner bore 190). The release of the two-stage release latch 320 enables the connectors 12 and 14 to continue into the second connection stage as discussed in further detail below.

Although illustrated embodiment shows the latch arms 322 as having the latch grooves 324 and the movable support 114 as having the overhangs 330, in certain embodiments, the latch arms 322 may include protrusions (e.g., overhangs) and the movable support 114 may include corresponding grooves. Although two latch arms 322 are visible in the illustrated embodiment, the two-stage release latch 320 may include four latch arms around the inner bore 190, radially spaced by 90 degrees. In certain embodiments, the latch arms 322 may be radially offset by a substantial 45 degrees with respect to the springs and/or contacts. In some embodiments, the two-stage release latch 320 may include two or more latch arms. For example, the two-stage release latch 320 may include three latch arms, four latch arms, five latch arms, six latch arms, etc.

Figure 6:
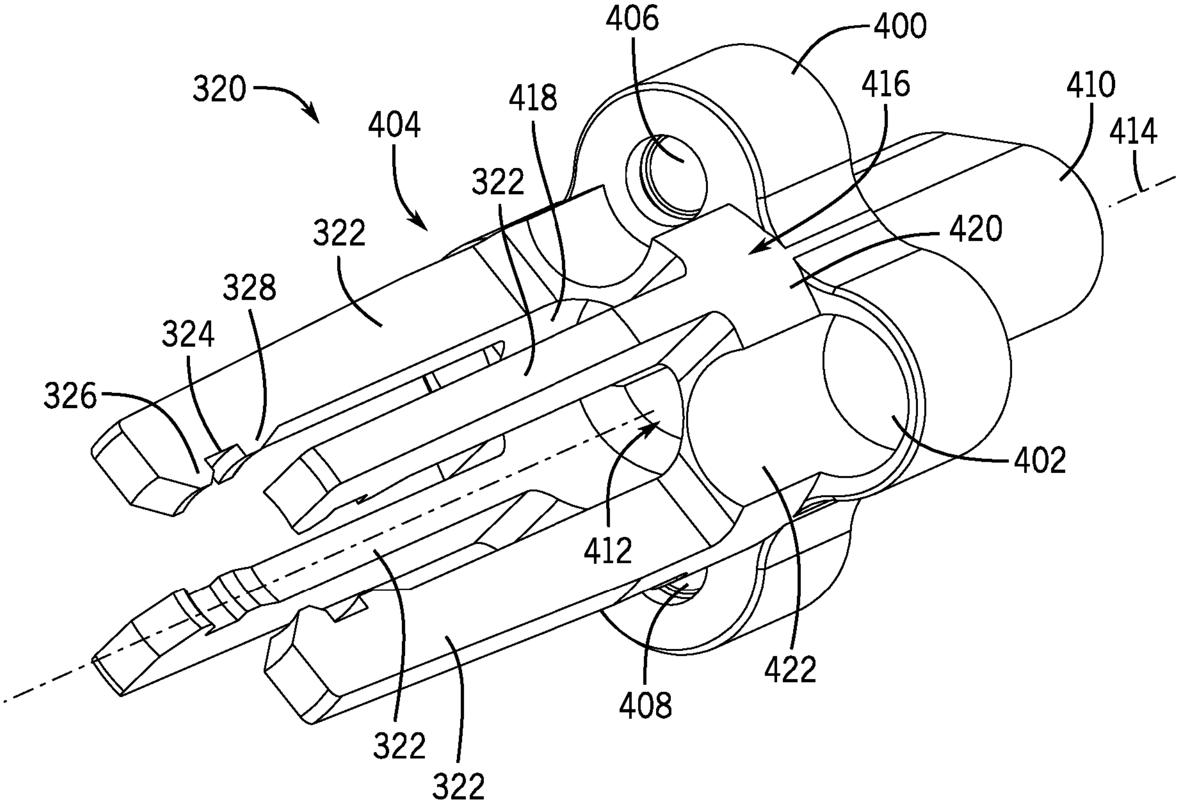
FIG. 6 is a perspective view of a two-stage release latch of the subsea electrical connection system of FIG. 1, according to an embodiment of the present disclosure.

FIG. 6 is a perspective view of the two-stage release latch 320 of the subsea electrical connection system 10 of FIG. 1. In the illustrated embodiment, the two-stage release latch 320 includes the latch arms 322 (e.g., four arms) extending axially from a latch manifold section 400. In certain embodiments, the two-stage release latch 320 may be constructed from a resilient material, such as a resilient plastic, configured to provide some spring biasing force in the latch arms 322. The latch manifold section 400 includes first and second axial spring mounting holes 402 and 404, as well as first and second axial contact holes 406 and 408. The two-stage release latch 320 also includes a latch base section 410 coupled to the latch manifold section 400. The latch arms 322 include the first and second latch protrusions 326 and 328. The second latch portion 328 is configured to be axially positioned further along the longitudinal direction 36, and the latch groove 324 axially disposed between the first and second latch protrusions 326 and 328. The latch arms 322 are circumferentially spaced (e.g., equally circumferentially spaced) about an inner bore portion 412, and the inner bore portion 412 is disposed along a central axis 414 of the two-stage release latch 320.

In the illustrated embodiment, the latch arms 322 are coupled to the latch manifold section 400 via structural supports 416, disposed at the base of each latch arm 322. The structural supports 416 have a larger thickness than the latch arms, thereby providing structural support (e.g., mechanical support) to the latch arms 322. The structural supports 416 are disposed about the inner bore portion 412 such that an interior wall 418 of the structural supports 416 form a perimeter wall of the inner bore portion 412. An exterior wall 420 of the structural supports 416 is shaped so as to provide clearance for the first and second axial spring mounting holes 402, 404 and the first and second axial contact holes 406 and 408. As shown in the illustrated embodiment, the structure supports 416 are rotated substantially 45 degrees relative to the first and second axial spring mounting holes 402, 404, and first and second axial contact holes 406 and 408. In this configuration, the exterior wall 420 includes partial annular cutaways 422 disposed between each of the structural supports 416, such that the partial annular cutaways 422 provide clearance for the springs and axial contacts.

In the illustrated embodiment, the first and second spring mounting holes 402 and 404 are blind holes in the latch manifold section 400. In this manner, the first and second spring mounting holes 402 and 404 are configured to provide a mounting of the springs directly onto the two-stage release latch 320. As shown in the illustrated embodiment, the first and second axial contact holes 406 and 408 extend completely through the latch manifold section 400, thereby enabling the mating axial contacts (e.g., or axial contacts) to pass through the latch manifold section 400 of the two-stage release latch 320.

As shown in the illustrated embodiment, the latch arms 322 are disposed (e.g., equally circumferentially spaced) about the inner bore portion 412 such that the first and second protrusions 326 and 328 are directed toward the central axis 414. The first latch protrusions 326 include a tapered portion 424, such that the first latch protrusion 326 tapers inward along a travel in the longitudinal direction 36. In the illustrated embodiment, the first latch protrusions 326 extend further radially inward than the second latch protrusion 328 although, in certain embodiments, the first and second latch protrusions 326 and 328 radially extend the same distance. The first and second latch protrusions 326 and 328 are configured to retain the movable support 114 (e.g., an annular portion of the movable support 114) in the latch grooves 324. The tapered portions 424 are configured to abut the shuttle protrusions via the shuttle abutting the tapered portion 424 of each latch arm 322 (e.g., concurrently), thereby causing a radial expansion of the latch arms 322. In response to the radial expansion of the latch arms 322, the second latch protrusions 328 expand beyond the diameter of the inner bore (e.g., inner bore portion 412), thereby enabling an axial movement (e.g., in direction 36) of the movable support 114 through the inner bore portion 412.

In certain embodiments, the inner bore portion 412 may extend though the manifold section 400 and/or the base portion 410 of the two-stage release latch 320.

Figure 7:
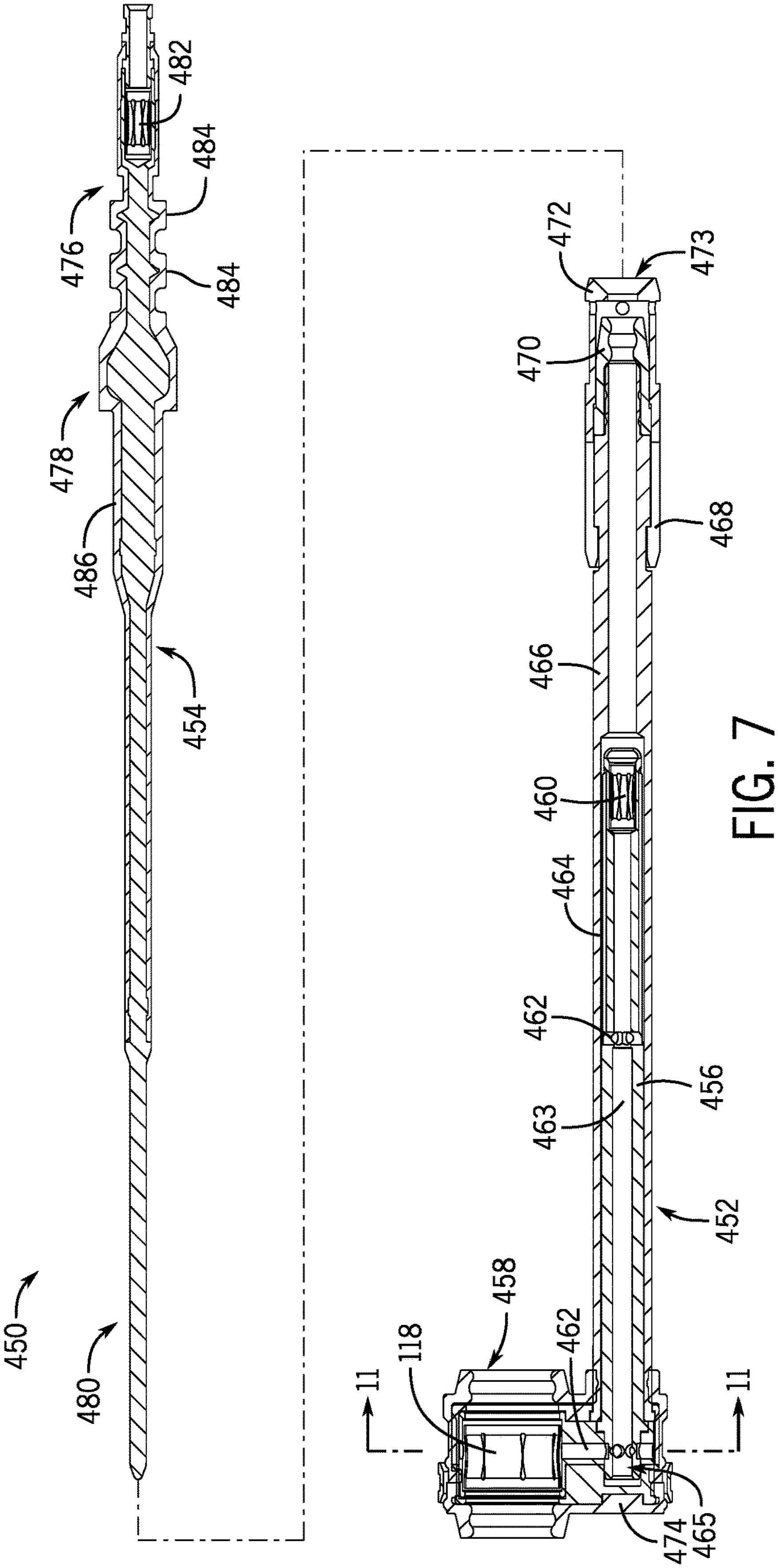
FIG. 7 is an exploded cross-sectional view of an axial connector assembly of the subsea electrical connection system of FIG. 1, according to an embodiment of the present disclosure.

FIG. 7 is a cross-sectional view of an axial connector assembly 450 of the subsea electrical connection system 10 of FIG. 1. The axial connector assembly 450 includes a connector portion 452 (e.g., first and second connector portions 194 and 196) and a mating connector portion 454 (e.g., first and second mating connector portions 270 and 276). The connector portion 452 includes an axial contact 456 (e.g., first and second axial contacts 252 and 254) coupled to a radial contact 118 configured to encircle an inner bore portion 458. The axial contact 456 is configured to be radially offset from the inner bore portion 458. The axial contact 456 includes louvers 460, radial ports 462, a contact bore 463, axial channels 464, a fluid chamber 465. The connector portion 452 also includes an insulation layer 466 (e.g., PEEK insulation) configured to enclose the axial contact 456. The insulation layer 466 includes an insulation cap 468 (e.g., annular insulation cap) disposed on an axial end of the axial contact 456, a seal 470 (e.g., annular seal) disposed inside the insulation cap 468, and a wiper 472 (e.g., annular wiper) disposed about an axial opening 473 of the connector portion 452. In certain embodiments, the insulation layer 466 may include one or more insulation coatings disposed around a body (e.g., tubular body) of the connector portion 452. In some embodiments, the insulation layer 466 may at least partially, substantially, or completely form the body (e.g., tubular body) of the connector portion 452. For example, as shown in the illustrated embodiment, the axial contact 456 extends through the connector portion 452 (e.g., coated or surrounded with insulation) over a first distance, whereas the connector portion 452 is composed of the insulation layer 466 over a second distance. In certain embodiments, the first distance may be at least 20, 30, 40, 50, 60, or 70 percent of a length of the connector portion 452, while the second distance may be a remaining portion of the length of the connector portion 452.

As shown in the illustrated embodiment, the connector portion 452 also includes a pressure balancing barrier 474 (e.g., diaphragm) disposed about the fluid chamber 465 of the connector portion 452. The pressure balancing barrier 474 may include a resilient wall, such as an elastomeric wall, configured to flex and pressure balance fluids on opposite sides of the pressure balancing barrier 474. The fluid chamber 465 is configured to extend through the connector portion 452, including the axial contact 456 and, in certain embodiments, around the radial contact 118. The pressure balancing barrier 474 is configured to extend around the radial contact 118 and, in certain embodiments, at least partially through the axial contact 456. The pressure balancing barrier 474 may be disposed between the housing fluid chamber 122 and the fluid chamber 465, where the housing fluid chamber 122 is disposed outside the axial connector assembly 450 (e.g., connector portion 452).

In the illustrated embodiment, the mating connector portion 454 includes a cable connector portion 476, a base portion 478, and a contact pin 480. The cable connector portion 476 includes louvers 482 configured to accept a wire of a cable, and is coupled to the base portion 478. The base portion 478 includes protrusions 484 that, in certain embodiments, may be configured to partially retain axial movement of the mating connector portion 454. The contact pin 480 extends from the base portion 478. Additionally, the mating connector portion 454 includes an insulation layer 486 (e.g., PEEK insulation) disposed about the base portion 478 and cable connector portion 478. In certain embodiments, the connector portion 452 and mating connector portion 454 are pressure-balanced (e.g., via the pressure balancing barrier 474) between an internal connector fluid and an internal housing fluid surrounding the connector portion 452 and mating connector portion 454 inside of the outer housing 38. For example, the internal connector fluid may be contained at least partially within and/or internally between the connector portion 452 and mating connector portion 454, at least partially around the radial contact 118, and separate from the internal housing fluid, wherein the pressure balancing barrier 474 may define a resilient housing or enclosure (e.g., annular diaphragm enclosure) around the radial contact 118. It may be appreciated that the individually pressure-compensated connector portion 452 and mating connector portion 454, and a resulting fluid film separation (e.g., non-conductive fluid or oil separation) between the contact elements (e.g., axial contact 456, contact pin 480) may improve tracking (e.g., electrical tracking) between the axial contact 456 and/or contact pin 480 and the insulation layers 466, 486. Furthermore, the dual insulation (e.g., housing insulation layer and insulation layers 466, 486) of the connector portion 452 and mating connector portion 454 may provide improved insulation resistance and longevity in service conditions.

The mating connector portion 454 is configured to mate (e.g., connect with) the connector portion 452 in response to an insertion of the contact pin 480 into the axial opening 473 of the connector portion 452. The mating connector portion 454 and connector portion 452 make electrical contact in response to the contact pin 480 making physical contact with the louvers 460 of the axial contact 456. The louvers 460 are configured to maintain electrical continuity as the contact pin 480 travels an axial path through the contact bore 463. In response to the contact pin 480 traveling through the contact bore 463, fluid (e.g., oil) residing in the contact bore 463 may flow through the radial ports 462, and into the axial channels 464 and fluid chamber 465. In certain embodiments, the pressure balancing barrier 474 may expand and/or contract in response to the flow of fluid through the fluid chamber 465. As the contact pin 480 travels through the contact bore 463, the seal 470 and/or wiper 472 make contact with the insulation layer 486 of the base portion 478 of the mating connector portion 454, thereby sealing the contact bore 463 from the fluid in the housing fluid chamber. In this manner, the interior of the connector portion 462 (e.g., contact bore 463) may be substantially shielded from fluid disposed in the housing fluid layer disposed outside of the connector portion 452 and mating connector portion 454.

Although the illustrated embodiment shows only a single connector portion 452 and mating connector portion 454, one or more connector portions and corresponding mating connector portions may be used for connector portion 116 discussed in detail above. In this manner, each connector portion 116 may include a separate pressure balancing barrier disposed about the corresponding radial contact 118 and corresponding axial contact. Furthermore, while the illustrated embodiment shows the connector portion 452 as being a tubular connector (e.g., female connector) and the mating connector portion 454 as being a contact pin connector (e.g., male connector), in certain embodiments, the connector portion 454 may be a contact pin connector (e.g., male connector) and the mating connector portion 454 may be a tubular connector (e.g., female connector).

Figure 8:
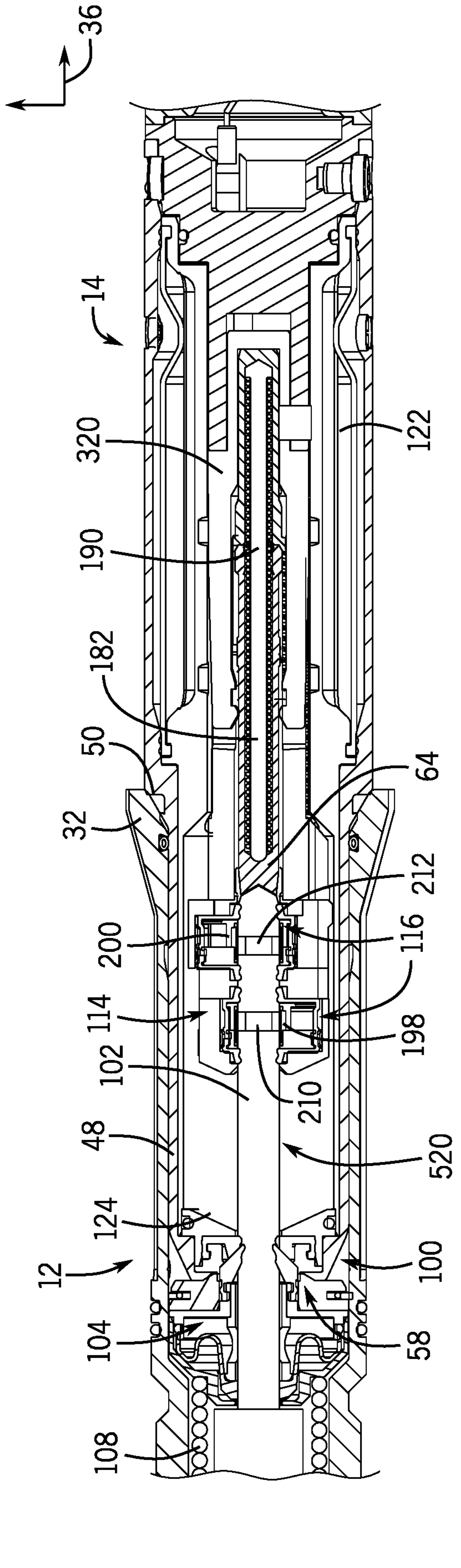
FIG. 8 is a cross-sectional view of the subsea electrical connection system of FIG. 1 at a second connection stage, according to an embodiment of the present disclosure.

FIG. 8 is a first cross-sectional view of the subsea electrical connection system 10 of FIG. 1 at a second connection stage. The first cross-sectional view of FIG. 8 may be in the same plane as the cross-section of FIG. 5, further illustrating the second connection stage upon release of the two-stage release latch 320. In the illustrated embodiment, the second connection stage includes a subsequent axial travel (e.g., insertion) of the mating portion 48 of the connector 14 into the axial chamber 100 of the connector 12. The insertion may result from a relative movement of the connector 14 with respect to the connector 12 in the direction opposite longitudinal direction 36, a relative movement of the connector 12 with respect to the connector 14 in the longitudinal direction 36, or a combination thereof. As a result of the insertion of the mating portion 48, the wiper assembly 104 is depressed (e.g., via wiper spring 108) to a rear side of the axial chamber 100, and the mating edge 50 of the connector 14 abuts the frustoconical guide 32 of the connector 12. Furthermore, due to the central pin 102 being retained (e.g., substantially rigidly retained) by the connector 12, the central pin 102 travels a second axial distance within the connector 14.

As shown in the illustrated embodiment, the movable support 114 (e.g., and connector portions 116) is configured to move along a second axial path of travel (e.g., stack up) in longitudinal direction 36 during the second connection stage in response to the expansion of the two-stage release latch 320, thereby enabling the movable support 114 to travel an axial distance through the central bore 182 (e.g., or through the inner bore 190). In certain embodiments, the second axial path of travel may include an axial distance (e.g., stack up distance) of 1, 2, 3, 4, 5, or more cm. Because the central pin 102 and the movable support 114 are both configured to move along the same axial path of travel during the second connection stage, the first and second radial contacts 198 and 200 remain axially aligned with the first and second mating radial contacts 210 and 212, respectively. As shown in the illustrated embodiment, the shuttle pin 64 is configured to abut the movable support 114 in the inner bore 190. In certain embodiments, in response to the abutment between the shuttle pin 64 and the movable support 114, the shuttle pin 64 and the movable support 114 are configured to move together (e.g., concurrently) along the second axial path of travel during the second connection stage.

In certain embodiments, a cavity 520 (e.g., annular cavity), disposed between the first axial end 58 of the connector 14 and the movable support 114, may form in response to the movable support 114 traveling down the second axial path of travel. In some embodiments, an internal fluid (e.g., oil) disposed in the housing fluid chamber 122 may flow around the movable support 114 (e.g., via fluid paths 124) to fill the volume of the cavity 520.

Figure 9:
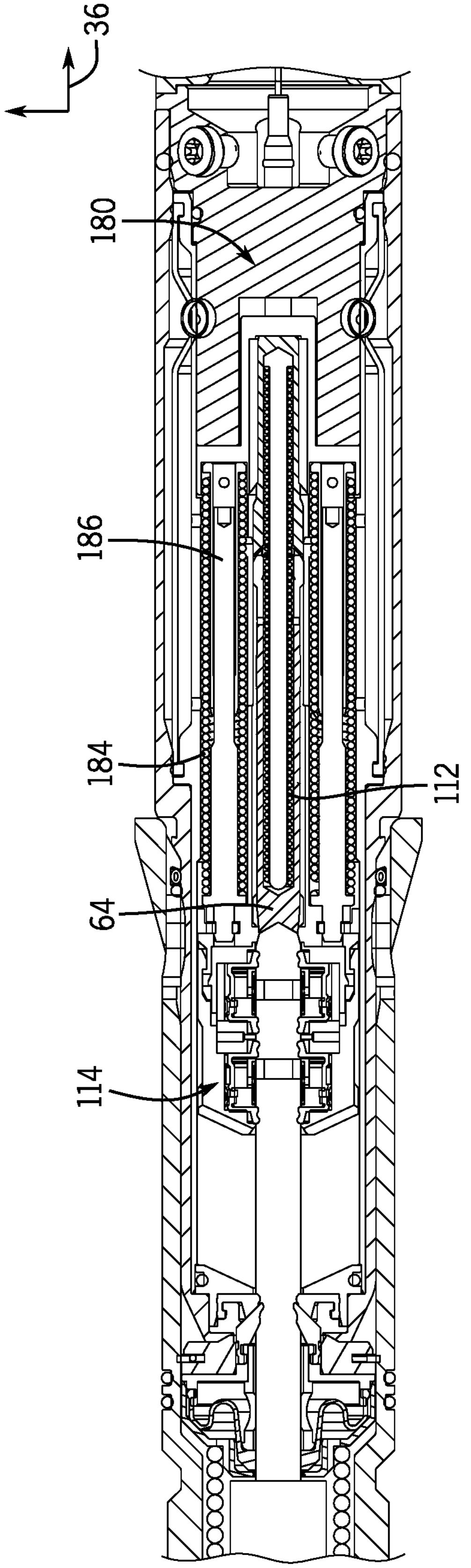
FIG. 9 is a cross-sectional view of the subsea electrical connection system of FIG. 1 at the second connection stage, according to an embodiment of the present disclosure.

FIG. 9 is a second cross-sectional view of the subsea electrical connection system 10 of FIG. 1 at the second connection stage. The second cross-sectional view of FIG. 9 may be in the same plane as the cross-section of FIG. 3, further illustrating the second connection stage. As shown in the illustrated embodiment, the springs 184 are compressed in response to the movable support 114 traveling the second axial path of travel during the second connection stage. In certain embodiments, the movable support 114 is coupled to the stationary support 180 via the springs 184 such that the springs 184 exert a biasing force on the movable support 114 during the second connection stage. As shown in the illustrated embodiment, the posts 186 disposed through the springs 184 decrease in length as a result of the movable support 114 traveling the second axial path of travel (e.g., via a telescoping action). In certain embodiments, the shuttle pin spring 112 is coupled to the shuttle pin 64 and the movable support 114. In this manner, the shuttle pin spring 112 may remain unchanged from the first connection stage due to a concurrent second axial path of travel of both the shuttle pin 64 and the movable support 114. In other embodiments, the shuttle pin spring 112 may further compress during the second connection stage (e.g., due to relative motion between the shuttle pin 64 and movable support 114).

Figure 10:
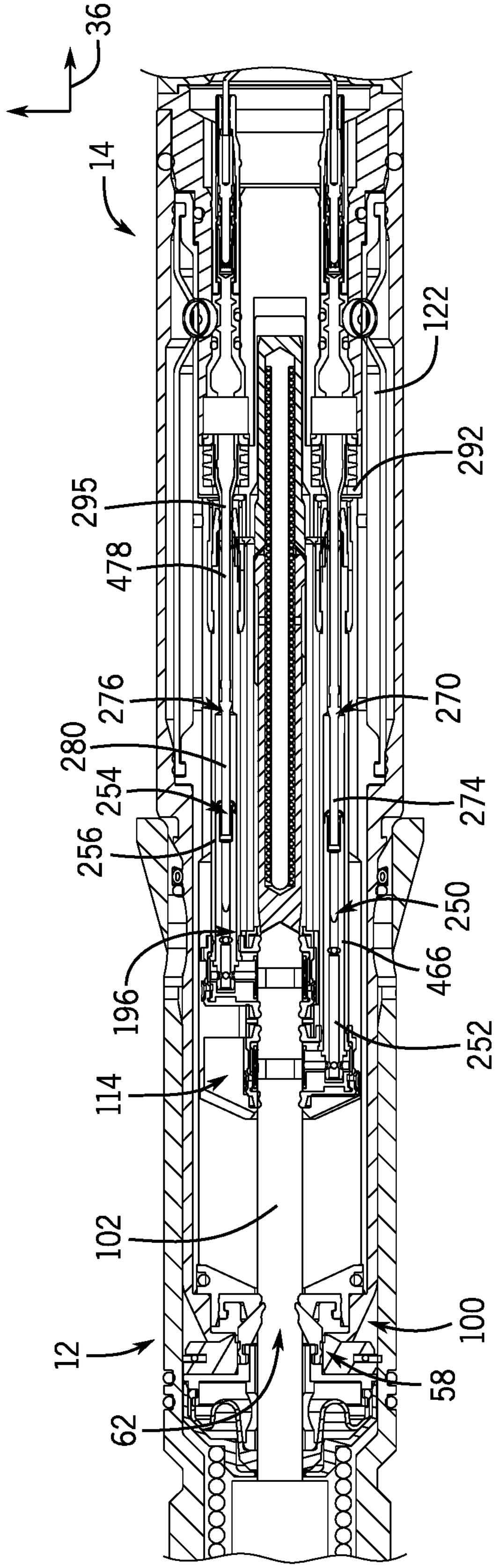
FIG. 10 is a cross-sectional view of the subsea electrical connection system of FIG. 1 at the second connection stage, according to an embodiment of the present disclosure.

FIG. 10 is a third cross-sectional view of the subsea electrical connection system 10 of FIG. 1 at the second connection stage. The third cross-sectional view of FIG. 10 may be in the same plane as the cross-section of FIG. 4, further illustrating the second connection stage. In the illustrated embodiment, the first and second connector portions 194 and 196 overlap with first and second mating connector portions 270 and 276, respectively. In this manner, the first and second axial contacts 252 and 256 axially engage and axially overlap with the first and second mating axial contacts 274 and 280, respectively, over a first axial distance in response to the movable support 114 traveling the second axial path of travel. As shown in the illustrated embodiment, the first and second axial contacts 252 and 256 engage the contact pins of the first and second mating axial contacts 274 and 280, respectively, in response to the second axial travel of the of the movable support 114. The first and second axial contacts 252 and 256 continually engage the contact pins of the first and second mating axial contacts 274 and 280, respectively, throughout the second axial path of travel via the louvers disposed within the first and second axial contacts 252 and 256. Additionally, the first and second seals 292 and 295 (e.g., wipers 472) engage with the base portions 478 (e.g., insulation layer 486) of the first and second mating axial contacts 274 and 280, respectively, in order to shield the first and second axial contacts 252, 256, and the contact pins of the first and second mating axial contacts 274 and 280 from fluid (e.g., oil from housing fluid chamber 122, water) that may be disposed outside the insulation layer 466 of the first and second connector portions 194 and 196.

In certain embodiments, the contact pins of the first and second mating axial contacts 274 and 280 remain electrically (e.g., and physically) coupled with the first and second axial contacts 252 and 256, respectively, during both the first and second connection stages. That is, the first and second electrical paths 250 and 254 maintain electrical continuity throughout both the first and second connection stages. In other embodiments, the first and second mating axial contacts 274 and 280 are electrically decoupled from the first and second axial contacts 252 and 256, respectively, during at least part of the first connection stage, and become electrically coupled at the end of the first connection stage and/or during the second connection stage. Accordingly, in some embodiments, a portion of the first and/or second axial path of travel of the first and second axial contacts 252 and 256 (e.g., or first and second mating axial contacts 274 and 280) may include a first portion of axial travel having no electrical continuity. The first portion of axial travel may be followed by a second portion of axial travel where electrical continuity between the first and second axial contacts 252, 256 and first and second mating axial contacts 274, 280 is established and maintained throughout the second portion of axial travel. The two-stage connection of the connector 12 and connector 14 may improve stability of the first and second axial contacts 252, 256 and first and second mating axial contacts 274, 280 during the mating process. Furthermore, the second connection stage may allow the engagement of the first and second axial contacts 252, 256 and first and second mating axial contacts 274, 280 to be independent of spring forces exerted by the springs.

Figure 11:
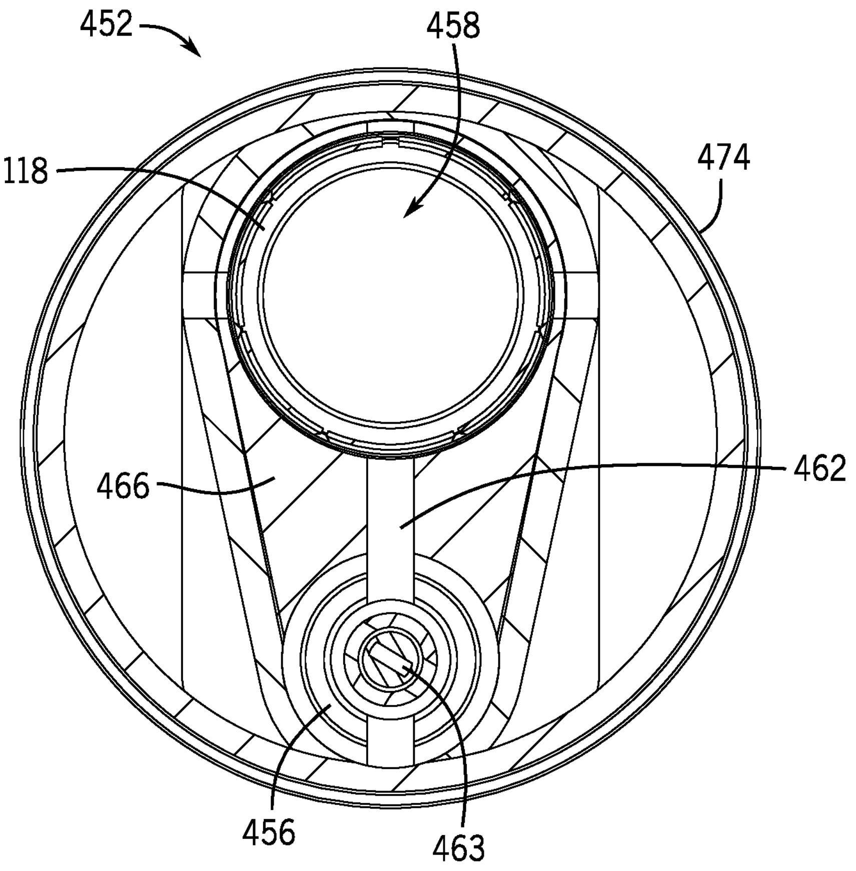
FIG. 11 is a cross-sectional view of the axial connector assembly of FIG. 7, according to an embodiment of the present disclosure.

FIG. 11 is a cross-sectional view of the axial connector assembly 450 (e.g., axial connector portion 452) of FIG. 7. As shown in the illustrated embodiment, the axial connector assembly 450 includes a radial contact 118 (e.g., annular electrical contact) disposed about an inner bore portion 458. The axial connector assembly 450 also includes one or more radial bores 462 configured to fluidly couple the inner bore portion 458 with the contact bore 463. Additionally, the axial connector assembly 450 is configured to electrically couple the radial contact 118 with the axial contact 456. In certain embodiments, the axial connector assembly 450 may include insulation (e.g., insulation layer 466) disposed about (e.g., between, around) an area spanning between the radial contact 118 and the axial contact 456. As shown in the illustrated embodiment, the radial contact 118 and, in certain embodiments, a portion of the axial contact 456 are encapsulated by the pressure balancing barrier 474. In certain embodiments, the pressure balancing barrier 474 may be configured to expand and/or contract radially in response to a flow of fluid (e.g., oil) into the pressure balancing barrier 474 due to an insertion of a contact pin into the contact bore 463 during the second connection stage. In certain embodiments, the pressure balancing barrier 474 may be composed of an elastomeric material and/or may be configured to provide a seal about the inner bore portion 458 while the central pin 102 is inserted.

While the above embodiments generally present a mating of the connector 12 and the connector 14 via a first connection stage followed by a second connection stage, it should be noted that the connector 12 and connector 14 may also be configured to disconnect via a reversal of the connection stages. That is, the mating portion 48 of the connector 14 may move in longitudinal direction 36 relative to connector 12, and thereby extracted from the axial chamber 100. In certain embodiments, a disconnection of the connector 12 and connector 14 may begin with a reversed second connection stage. The reversed second connection stage may include a movement of the movable support 114 toward the axial end 58 of the connector 14 via expansion of springs 184. Concurrently, the first and second axial contacts 252 and 256 may engage the first and second mating axial contacts 274 and 280, respectively, in a reversed (e.g., reversed direction) second axial path of travel. In response to the overhang (e.g., annular overhang) of the movable support 114 engaging the latch grooves of the two-stage release latch, the movable support 114 may be retained by the two-stage release latch 320, thereby unable to continue moving toward the axial end 58. In response to the retention of the movable support 114, a reversed first connection stage may commence, in which the mating portion 48 is further extracted from the axial chamber 100. As the mating portion 48 is extracted, the shuttle pin 64 moves toward the axial end 58 via the shuttle pin spring 112 until the central pin 102 exits the second axial opening 62 of the connector 14.

As used herein, the terms “inner” and “outer”; “up” and “down”; “upper” and “lower”; “upward” and “downward”; “above” and “below”; “inward” and “outward”; and other like terms as used herein refer to relative positions to one another and are not intended to denote a particular direction or spatial orientation. The terms “couple,” “coupled,” “connect,” “connection,” “connected,” “in connection with,” and “connecting” refer to “in direct connection with” or “in connection with via one or more intermediate elements or members.”

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for [perform]ing [a function] . . . ” or “step for [perform] ing [a function] . . . ,” it is intended that such elements are to be interpreted under 35 U.S.C. § 112 (f). However, for any claims containing elements designated in any other manner, it is intended that such elements are not to be interpreted under 35 U.S.C. § 112 (f).

What is claimed is:

1. A system, comprising:

a first electrical connector configured to removably couple with a second electrical connector, wherein the first electrical connector comprises:

a housing having an axial opening;

a movable support disposed inside the housing, wherein the movable support comprises a first connector portion having a first electrical path with a first radial contact electrically coupled to a first axial contact;

a stationary support disposed inside the housing, wherein the stationary support comprises a first mating connector portion having a first mating electrical path with a first mating axial contact coupled to a first electrical cable; and a shuttle pin configured to engage with the second electrical connector through the axial opening in the housing, wherein the shuttle pin is configured to move along a first axial path of travel in a first connection stage, wherein the movable support is configured to move along a second axial path of travel in a second connection stage;

wherein the first connection stage is configured to engage the first radial contact of the first electrical connector with a first mating radial contact of the second electrical connector at a first axial position in response to the first axial path of travel;

wherein the second connection stage is configured to engage the first axial contact with the first mating axial contact over a first axial distance in response to the second axial path of travel.

2. The system of claim 1, wherein the shuttle pin and the movable support are configured to move together along the second axial path of travel during the second connection stage.

3. The system of claim 1, comprising a latch configured to hold the movable support, wherein the shuttle pin is configured to release the latch to enable movement of the movable support.

4. The system of claim 3, wherein the latch comprises a plurality of arms configured to radially contract to hold the movable support, and the plurality of arms are configured radially expand to release the movable support in response to an actuating portion of the shuttle pin engaging a tapered portion of the plurality of arms.

5. The system of claim 1, wherein the movable support comprises a second connector portion having a second electrical path with a second radial contact electrically coupled to a second axial contact, wherein the stationary support comprises a second mating connector portion having a second mating electrical path with a second mating axial contact coupled to a second electrical cable, wherein the first connection stage is configured to engage the second radial contact of the first electrical connector with a second mating radial contact of the second electrical connector at a second axial position in response to the first axial path of travel, wherein the second connection stage is configured to engage the second axial contact with the second mating axial contact over a second axial distance in response to the second axial path of travel.

6. The system of claim 1, comprising a first pressure balancing barrier between a housing fluid chamber and a first fluid chamber and a second pressure balancing barrier between the housing fluid chamber and a second fluid chamber, wherein the housing fluid chamber is disposed inside the housing and outside of the first and second connector portions, wherein the first fluid chamber extends through the first connector portion and the second fluid chamber extends through the second connector portion.

7. The system of claim 1, wherein the first axial contact engages with the first mating axial contact via a first concentric arrangement of a first axial tube and a first axial pin over the first axial distance.

8. The system of claim 1, comprising a first spring biasing the shuttle pin and a second spring biasing the movable support.

9. The system of claim 8, wherein the first spring is configured to compress during the first connection stage and the second spring is configured to compress during the second connection stage.

10. The system of claim 1, wherein the first electrical connector comprises a first insulative layer disposed along an interior of the housing, and a second insulative layer disposed about the first electrical path and the first mating electrical path, wherein the system comprises a housing fluid chamber disposed between the first and second insulative layers.

11. The system of claim 1, comprising a first pressure balancing barrier between a housing fluid chamber and a first fluid chamber, wherein the housing fluid chamber is disposed inside the housing and outside of the first connector portion, and the first fluid chamber extends through the first connector portion.

12. The system of claim 11, wherein the first fluid chamber extends around the first radial contact and at least partially through the first axial contact, wherein the first pressure balancing barrier comprises a diaphragm.

13. The system of claim 1, comprising a mount coupled to the first electrical connector, wherein the mount comprises a rotatable arm coupled to a mounting flange, wherein the rotatable arm comprises an outer sleeve disposed about an inner conduit, wherein the inner conduit is configured to flex during rotation of the rotatable arm, wherein the mount comprises a first ball and socket joint between the first electrical connector and the rotatable arm, a second ball and socket joint between the rotatable arm and the mounting flange, or a combination thereof.

14. A system, comprising:

a first electrical connector configured to removably couple with a second electrical connector, wherein the first electrical connector comprises:

a housing having an axial opening;

a movable support disposed inside the housing, wherein the movable support comprises a first connector portion having a first electrical path with a first radial contact electrically coupled to a first axial contact;

a stationary support disposed inside the housing, wherein the stationary support comprises a first mating connector portion having a first mating electrical path with a first mating axial contact coupled to a first electrical cable;

wherein the second electrical connector is configured to extend through the axial opening in the housing, wherein a first mating radial contact of the second electrical connector is configured to engage with the first radial contact, wherein the first axial contact is configured to engage with the first mating axial contact;

a first insulative layer disposed along an interior of the housing; and a second insulative layer disposed about the first electrical path and the first mating electrical path.

15. The system of claim 14, comprising a housing fluid chamber disposed between the first and second insulative layers, and a first pressure balancing barrier between the housing fluid chamber and a first fluid chamber, wherein the housing fluid chamber is disposed inside the housing and outside of the first connector portion, and the first fluid chamber extends through the first connector portion.

16. The system of claim 14, comprising a first anti-tracking device coupled to the first mating axial contact and a second anti-tracking device coupled to a second mating axial contact, respectively, wherein the first and second anti-tracking devices are configured to extend a creepage distance associated with the first and second mating axial contacts.

17. The system of claim 15, comprising a mount coupled to the first electrical connector, wherein the mount comprises a rotatable arm coupled to a mounting flange, wherein the rotatable arm comprises an outer sleeve disposed about an inner conduit, wherein the inner conduit is configured to flex during rotation of the rotatable arm, wherein the mount comprises a first ball and socket joint between the first electrical connector and the rotatable arm, a second ball and socket joint between the rotatable arm and the mounting flange, or a combination thereof.

18. A method, comprising:

providing a first connection stage between first and second electrical connectors, wherein the first electrical connector comprises a movable support, a stationary support, and a shuttle pin disposed in a housing having an axial opening, wherein the movable support comprises a first connector portion having a first electrical path with a first radial contact electrically coupled to a first axial contact, wherein the stationary support comprises a first mating connector portion having a first mating electrical path with a first mating axial contact coupled to a first electrical cable, wherein the axial opening enables entry of the second electrical connector to engage the shuttle pin, wherein the first connection stage comprises movement of the shuttle pin along a first axial path of travel, wherein the first connection stage engages the first radial contact of the first electrical connector with a first mating radial contact of the second electrical connector at a first axial position in response to the first axial path of travel;

providing a second connection stage between the first and second electrical connectors, wherein the second connection stage comprises movement of the movable support along a second axial path of travel, wherein the second connection stage engages the first axial contact with the first mating axial contact over a first axial distance in response to the second axial path of travel; and providing insulation via a first insulative layer disposed along an interior of the housing and a second insulative layer disposed about the first electrical path and the first mating electrical path.

19. The method of claim 18, comprising providing a fluid in a housing fluid chamber disposed between the first and second insulative layers, and providing a first pressure balancing barrier between the housing fluid chamber and a first fluid chamber, wherein the housing fluid chamber is disposed inside the housing and outside of the first connector portion, and the first fluid chamber extends through the first connector portion.

20. The method of claim 18, comprising providing a mount coupled to the first electrical connector, wherein the mount comprises a rotatable arm coupled to a mounting flange, wherein the rotatable arm comprises an outer sleeve disposed about an inner conduit, wherein the inner conduit is configured to flex during rotation of the rotatable arm, wherein the mount comprises a first ball and socket joint between the first electrical connector and the rotatable arm, a second ball and socket joint between the rotatable arm and the mounting flange, or a combination thereof.

* * * * *